United States Patent [19]
Hess et al.

[11] 3,894,116

[45] July 8, 1975

[54] POLYMERIZATION INITIATOR

[75] Inventors: Bernhard Hess, Kapellen near Moers; Karl Raichle, Krefeld-Bockum, both of Germany

[73] Assignee: Bayer Aktiengesellschaft, Leverkusen-Bayerwerk, Germany

[22] Filed: Aug. 15, 1973

[21] Appl. No.: 388,484

Related U.S. Application Data

[63] Continuation-in-part of Ser. No. 272,758, July 18, 1972, abandoned.

[30] Foreign Application Priority Data

July 21, 1971 Germany............................ 2136493

[52] U.S. Cl.......... 260/863; 204/159.15; 260/63 K; 260/78.4 A; 260/80 C; 260/88.7 C; 260/89.1; 260/89.5 R; 260/89.5 A; 260/89.7 R; 260/91.1 R; 260/93.5 R; 260/836; 260/885
[51] Int. Cl............................ C08f 1/16; C08f 1/18
[58] Field of Search........ 260/863, 885, 80 C, 63 K, 260/78.4 A, 88.7 C, 89.1, 89.5 R, 89.5 A, 89.7 R, 91.1 R, 93.5 R; 204/159.15, 159.19

[56] References Cited
UNITED STATES PATENTS

| | | | |
|---|---|---|---|
| 2,722,512 | 11/1955 | Crandall | 204/158 |
| 3,031,301 | 4/1962 | Agens | 96/27 |
| 3,079,363 | 2/1963 | Koch et al. | 260/863 |
| 3,238,274 | 3/1966 | Allan | 260/863 |
| 3,657,088 | 4/1972 | Heine et al. | 204/159.15 |

FOREIGN PATENTS OR APPLICATIONS

| | | | |
|---|---|---|---|
| 881,629 | 11/1961 | United Kingdom | 260/863 |
| 1,156,460 | 6/1969 | United Kingdom | |

*Primary Examiner*—Melvin Goldstein
*Assistant Examiner*—E. A. Nielsen
*Attorney, Agent, or Firm*—Connolly and Hutz

[57] ABSTRACT

The invention provides a four-component polymerization initiator for free-radical polymerization and a polymerizable composition comprising the initiator.

14 Claims, No Drawings

POLYMERIZATION INITIATOR

CROSS-REFERENCE TO RELATED APPLICATION

This application is a continuation-in-part of application Ser. No. 272,758 filed July 18, 1972 and now abandoned.

This invention relates to a four-component polymerization initiator for free-radical polymerization processes.

This invention provides a four component initiator comprising:
A. an organic peroxide;
B. a compound of vanadium;
C. an acid of phosphorus having P—O—H acidity or a partial ester thereof having P—O—H acidity and
D. an α-hydroxyketone.

The invention also provides a polymerizable composition comprising:
A. an organic peroxide;
B. a compound of vanadium;
C. an acid of phosphorus having P—O—H acidity or a partial ester of such an acid having P—O—H acidity or an acidic salt of such an acid or ester;
D. an α-hydroxyketone; and
E. an unsaturated compound or mixture of copolymerizable unsaturated compounds the polymerization of which can be initiated by free radicals.

The four-component initiator enables the polymerization time of unsaturated compounds to be substantially reduced. This represents a considerable advantage in present-day streamlined polymerization processes, especially in molding and coating installations, since using the four-component initiator according to the invention a larger amount or number of items per unit time can be manufactured in the available plants.

The greatly reduced polymerization times of unsaturated compounds achievable with the new four-component initiator are caused by the specific interaction of all four components of the initiator. On omission of merely one of these components, for example the component D and/or C, or on using other metals, for example a cobalt compound instead of component B, substantially increased polymerization times result, which no longer offer an advantage over the customary two-component initiator mixtures consisting of a peroxide and a metal compound.

Mixtures of two or 3 of the above-mentioned components A–D are already known as initiators for the polymerization of unsaturated compounds (for example DAS Nos. 1,070,819 and 1,150,805, DOS No. 1,544,675 and DAS No. 1,158,707). However, none of these applications describes the advantageous combination of the four initiator components according to the invention for the polymerization of unsaturated compounds at room temperature, the advantages of which over the known initiator mixtures are explained by the examples according to the invention and the comparison examples.

Examples of unsaturated compounds which can be polymerized by radical mechanisms are: acrylic and methacrylic acid or esters or amides, such as methacrylic acid methyl ester, ethylene glycol bis-methacrylate, (meth)acrylic acid esters of epoxy resins, acrylonitrile, vinyl esters such as vinyl acetate and vinyl benzoate, adipic acid divinyl ester, vinylketones, vinyl halides, vinyl ethers, allyl esters such as allyl acetate, diallyl phthalate, triallyl cyanurate, dimethallyl isophthalate and allyl acrylate, styrene, substituted styrenes such as vinyltoluene, α-methylstyrene and halogenated styrenes and divinylbenzene.

The use of the new four-component initiator is of particular interest for the polymerization of mixtures of the unsaturated compounds which can be polymerized by radical mechanisms with unsaturated polyesters which contain radicals of α,β-unsaturated dicarboxylic acids and, if appropriate, a radical with an allyl ether configuration, and also for the polymerization of mixtures of the said compounds, for example of monomeric methacrylic acid methyl ester with polymethyl methacrylate, the so-called polymer syrup, which are used as molding and coating compositions.

Suitable components A in the new four-component initiator are organic peroxides such as ketone (hydro)-peroxides, e.g., cyclohexanone (hydro)peroxide, alkylated cyclohexanone (hydro) peroxide, methyl ethyl ketone (hydro)peroxide, methyl isobutyl ketone (hydro)-peroxide, actetylacetone (hydro)peroxide; such as hydroperoxides, e.g., cumyl hydroperoxide, tert-butyl hydroperoxide, 2.5-dimethylhexane-2.5-dihydroperoxide; such as alkyl peroxides, e.g., bis(tert.-butyl peroxy butane), di-tert.-butyl peroxide, dicumyl peroxide, tert.-butyl cumyl peroxide, n-butyl-4.4-bis(tert.-butylperoxy)valerate, 2.5-dimethyl-2.5-bis(tert.-butylperoxy)hexane, 2.5-dimethyl-2.5-bis(tert.-butylperoxy)hexyne; such as peroxyesters, e.g. tert.-butyl peroxyacetate, tert.-butyl peroxyisobutyrate, tert.-butyl peroxy (2-ethylhexanoate), tert.-butyl peroxybenzoate, tert.-butyl peroxyisopropyl carbonate, di-sec-butyl peroxydicarbonate, di-cyclohexyl peroxydicarbonate, tert.-butyl peroxypivalate, 2.5-dimethylhexyl-2.5-di (peroxybenzoate), 2.5-dimethyl-2.5-di(peroxy-2-ethylhexanoate), di-tert.-butyl diperoxyphthalate, tert.-butyl peroxymalate; such as diacyl peroxides, e.g., acetyl peroxide, benzoyl peroxide, caprylperoxide, p-chlorobenzoyl peroxide, 2.4-dichlorobenzoyl peroxide, decanoyl peroxide, lauroyl peroxide, pelargonyl peroxide, propionyl peroxide.

The above-mentioned organic peroxides are employed in the customary amounts, preferably approximately in amounts of 0.1 % by weight to 5 % by weight based on compound E. They are generally desensitized by common means as inert solvents, plasticizers, mineral oil or water.

Suitable initiator components B are compounds of 3-valent to 5-valent vanadium which are soluble in solvents like styrene, ethyl acetate, isopropanol, dimethyl formamide or monobutylphosphate in a minimum degree of 0.1 % by weight based on vanadium, such as vanadium-III chloride, vanadyl-IV-chloride, divanadium pentoxide, vanadyl p-toluenesulphonate, vanadyl acetate, vanadyl octoate, vanadium and vanadyl complexes with acetylacetone, acetylbenzoylacetone, oxalacetic acid esters and the like, acidic vanadium salts of phosphoric acid and partial esters of acids of vanadium, such as tert.-butyl ortho-vanadate. Said acidic phosphoric acid esters of vanadium can also be prepared in situ by mixing a vanadium oxide and component C. The initiator component B is used in amounts of 0.1 to 100 parts by weight, calculated as vanadium metal and related to 1 million parts by weight based on compound E.

The said compounds of vanadium are dissolved in the polymerizable unsaturated compounds or with the aid of solubilising additives, such as benzene, toluene, xylene, styrene, methyl acetate, ethyl acetate, butyl acetate, methanol, ethanol, iso-propanol, n-butanol, iso-butanol, iso-octanol, cyclohexanol, dimethyl formamide, dimethyl sulfoxide, acetone, methyl ethyl ketone, cyclohexanone or the components C mentioned below.

Suitable initiator components C are acids of phosphorus having P—O—H acidity such as phosphoric acid, polyphosphoric acid, pyrophosphoric acid, and phosphorous acid. As it is primarily important that the components C contain at least one free P—O—H grouping, the partial esters of the above mentioned acids are suitable, too. The alcohol component of said esters may be an alkanol with 1–24 C-atoms, a cycloalkanol with 5 – 24 C-atoms, an aryl alcohol with 5 – 24 C-atoms, an aralkyl alcohol with 6 – 24 C-atoms and the nitro-, halogen-, hydroxy- and alkoxy (with 1 – 12 C-atoms) substituted derivatives thereof. It is particularly advantageous if the acids or their partial esters are present in excess relative to the vanadium equivalent, that is to say amounts corresponding to 0.001 – 5 % by weight of phosphorus relative to component E.

A suitable initiator component D may be any α-hydroxy-ketone, such as compounds of formula

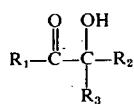

$R_1$, $R_2$ being the same or different, or forming a 5–8 membered ring together with the two C-atoms of the α-hydroxy-ketone group;
a. $R_1$, $R_2$ respresenting an aliphatic radical with 1–30 C-atoms, this aliphatic radical being an alkyl group, in case substituted by one or more nitro-, hydroxy- halogen-, amino- (in case substituted by 1-2 alkyl radicals with 1–6 C-atoms), alkoxy- (1–12 C-atoms), methylol- and/or methylolether group and-/or aromatic group (6–12 C-atoms);
b. respresenting a cycloaliphatic radical (5-7 ring), in case substituted by one or more nitro-, hydroxy-, halogen, amino- (in case substituted by 1-2 aliphatic radicals with 1–6 C-atoms), methylol- and-/or methylolether group, alkyl- (1–12 C-atoms) and/or alkoxy group (1–12 C-atoms);
c. respresenting an aromatic radical (1–16 C-atoms), in case substituted by aromatic radicals (1–12 C-atoms) or in case substituted by 1–4 alkyl- (1–10 C-atoms), 1-3 nitro-, 1–4 halogen-, 1–4 methylol- and/or methylolether groups, 1–4 alkoxy- (1–12 C-atoms) groups; such components D being, e.g., acetol, dihydroxy acetone, benzoin, α-hydroxy-methyl benzoin and nuclear-substituted benzoins, α-hydroxycyclopentanone, α-hydroxycyclohexanone, α-hydroxyketones substituted by aliphatic groups are particularly active.
d. $R_3$ representing hydrogen, an alkyl group (1-12 C-atoms), a methylol- or methylolether group.

The α-hydroxyketones are employed in amounts of 0.001 – 10 % by weight, preferably 0.005 – 3.0 % by weight, relative to component E. They can be dissolved in the polymerizable unsaturated compounds. They may within the scope of the invention be present in the form of sparingly soluble dimers, in which case small amounts of solvent for the dimers can be used conjointly such as esters, e.g., ethyl acetate, butyl acetate, isooctyl acetate; such as glycol ethers and the esters thereof, e.g., ethylene glycol monoethylether, ethylene glycol monoethylether acetate, ethylene glycol monobutylether, ethylene glycol monobutylether acetate; if such a solvent is used conjointly it has to be noted that a greater amount of solvent lowers the qualities of the resulting products, because the solvent works as a plasticizer; in a better way the dimers can be stirred in above their melting point.

Some α-hydroxy compounds are in the form of crystalline dimers which however again decompose into the monomers on fusion and can advantageously be incorporated in this form into the mixtures.

Almost colourless polymerization products are obtained if, for example, dihydroxyacetone, α-hydroxycyclohexanone or α-hydroxycyclopentanone are used as the initiator component D, and these are therefore particularly preferred. Some α-hydroxyketones in air-drying unsaturated polyester resins not only accelerate the polymerization but also the drying of the surfaces of the polymers which are exposed to the air. These include: dihydroxyacetone, acetol, α-hydroxycyclohexanone and α-hydroxycyclopentanone.

The four-component initiator according to the invention produces a significant reduction in the polymerization time. The gelling time can serve as a measure thereof. As is shown in the examples, it can be shortened, in the case of the polymerization of a polymethyl methacrylate syrup with the four-component initiator system according to the invention, at room temperature, to 20 minutes in comparison to 5 hours without component D. The gelling time of the styrene solution of an unsaturated polyester at room temperature can, with the four-component initiator system, be shortened to 90 seconds in comparison to 25 minutes without the component C. Such three-component initiator systems retained for comparison are the known and customary systems.

Monomers of low viscosity can also be polymerized at room temperature with the 4-component initiator system according to the invention. Thus, for example, using the system it is also possible to polymerize monomeric vinyl acetate within 30 minutes at room temperature to give a polymer syrup, whilst this requires approx. 30 hours without the component D. In this case it can be advantageous to add component A in portions.

The polymerizable compositions of the invention, which are generally polymerizable at room temperature can be manufactured in various ways:

The initiator component D is dissolved in the unsaturated compound, in which case it may be advantageous to melt the compound beforehand. The initiator components C and B, and thereafter A, can then be stirred in, or the converse procedure can be followed.

It is also possible, for example, to dissolve the initiator component A in a part of the unsaturated compound and the initiator components B, C and D together in another part. After mixing the two parts, the polymerization starts. Here again, further combinations are possible. It has to be noted, however, that mixing of components A and B without the unsaturated compound has to be avoided.

For use in lacquer technology, the so-called active primer process can also be adopted; for example, the initiator components A and C together with, for example, nitrocellulose and inert solvents can be applied as a film, the so-called active primer, onto substrates. After covering this active primer with, for example, the styrene solution of an unsaturated polyester, which contains the initiator components B and D, a cured lacquer film is produced in a very short time.

Numerous other combinations are similarly possible, and some of these combinations offer some particular technical advantage in processing.

Of course, the polymerization of the unsaturated compounds with the four-component initiator according to the invention can also be carried out in the presence of fillers, pigments, dyestuffs, thickeners, paraffins, UV-absorbers, inert solvents, smoothing agents and similar auxiliaries. Depending on the ratio of filler to polymerizable unsaturated compound, spreadable filling compositions or putties, or resin compositions which can be cast or sprayed, are obtained, and these polymerize within a short time at room temperature to give molded materials, moldings and coatings.

Our copending application P 2 136 633 relates to storage-stable polyester molding and coating compositions comprising, as additional stabilizers, dibasic acids of phosphorus.

In order to demonstrate the specificity of the four-component initiator according to the invention, Table I shows, for comparison, the polymerization of the unsaturated polyester solution PE 1 with cyclohexanone hydroperoxide as component A, various vanadium compound solutions I – IV as component B, in combination with and without a partial phosphoric acid ester as component C, and with and without dihydroxyacetone as component D.

Method 10 g portions of PE 1 solutions are mixed, in test tubes, in the following sequence, with the listed amounts, in grams, of fused dihydroxyacetone (component D), partial phosphoric acid ester (component C), peroxide paste (component A) and lastly vanadium compound solution (component B) and the gelling time is subsequently determined in a thermostat at 20°C. The vanadium compound solution I (component B) already contains partial phosphoric acid ester (component C):

Table I

| Example No: | 1 | 1a | 2 | 2a | 2b | 3 | 3a | 3b | 4 | 4a | 4b | 4c |
|---|---|---|---|---|---|---|---|---|---|---|---|---|
| Component A: AP-Peroxide paste | 0.40 | 0.40 | 0.40 | 0.40 | 0.40 | 0.40 | 0.40 | 0.40 | 0.40 | 0.40 | 0.40 | 0.40 |
| Component B+C Vanadium compound solution I | 0.10 | 0.10 | — | — | — | — | — | — | — | — | — | — |
| Component B Vanadium compound solution II | — | — | 0.10 | 0.10 | 0.10 | — | — | — | — | — | — | — |
| " III | — | — | — | — | — | 0.10 | 0.10 | 0.10 | — | — | — | — |
| " IV | — | — | — | — | — | — | — | — | 0.10 | 0.10 | 0.10 | 0.10 |
| Component C Diisooctyl phosphate | — | — | 0.20 | — | — | 0.20 | — | — | 0.10 | — | — | 0.10 |
| Component D Dihydroxyacetone | 0.05 | — | 0.05 | 0.05 | — | 0.05 | 0.05 | — | 0.05 | 0.05 | — | — |
| Gelling time (minutes) | 0.5 | 11 | 1 | 6 | 6 | 1.5 | 25 | 25 | 1 | 4 | 5 | 7 |

*The amounts listed here are specified in grams.

EXAMPLES

In the examples which follow, two unsaturated polyesters are used, the composition of which in parts by weight is given below. They are manufactured in a known manner by melt condensation, until the below-mentioned viscosity and acid number are obtained, and are dissolved in styrene.

|  | PE 1 | PE 2 |
|---|---|---|
| Maleic anhydride | 588 | 980 |
| Phthalic anhydride | 592 | — |
| 1,2-Propylene glycol | 798 | 730 |
| Trimethylolpropane diallyl ether | — | 856 |
| Hydroquinone | — | 0.48 |
| Toluhydroquinone | 0.36 | — |
| Characteristics of the solutions in styrene: |  |  |
| Solids content: | 54% | 54% |
| Viscosity (20°C) | 240 cP | 110 cP |
| (measured by falling ball viscosimeter according to Hoppler) |  |  |
| Acid number: | 19 | 14 |

Abbreviations in Tables I – V

| 1) AP-Peroxide paste: | Cyclohexanone hydroperoxide, 50% strength in dibutyl phthalate |
| 2) Vanadium compound solution I: | Solution of $V_2O_5$ in phosphoric acid mono-n-butyl ester and toluene (phosphorus content = 2.7 %; molar ratio of vanadium : phosphoric acid ester = 1 : 9) |
| " II: | Solution of vanadyl p-toluenesulphonate in isopropanol and xylene |
| " III: | Solution of vanadyl acetylacetonate in dimethylformamide |
| " IV: | Solution of vanadyl chloride in ethanol. |

All the vanadium compound solutions are adjusted to a vanadium content of 0.5 % by weight.

Table I demonstrates the significant reduction in the gelling time in Examples 1, 2, 3 and 4 according to the invention, in comparison to the remaining examples in which, in each case, one or two of the 4 initiator components according to the invention are absent.

In the examples which follow, lacquer films are produced with various α-hydroxyketones, and are compared. The composition of the lacquer solution, the time in which a continuous paraffin layer has formed, and the time in which the paraffin surface has become non-smudging are summarised in Table II and serve as a measure of the polymerization time.

Method 10 g portions of PE 1 solutions are mixed, in test tubes, with the listed amounts, in grams, of α-hydroxyketone, peroxide paste, paraffin solution (paraffin of melting point 51°–53°C, 10% strength in toluene) and lastly vanadium compound solution I, and 500 μ thick films are spread on glass plates by means of a film spreading instrument. Abbreviations as in Table I.

Table II*

*The amounts listed here are specified in grams.

| Example No. | 5 | 6 | 7 | 8a |
|---|---|---|---|---|
| Component A |  |  |  |  |
| AP-Peroxide paste | 0.40 | 0.40 | 0.40 | 0.40 |
| Components B + C |  |  |  |  |
| Vanadium compound solution I | 0.10 | 0.10 | 0.10 | 0.10 |
| Component D |  |  |  |  |
| Acetol | 0.025 | — | — | — |
| Dihydroxyacetone | — | 0.025 | — | — |
| α-Hydroxycyclohexanone | — | — | 0.025 | — |
| Paraffin solution | 0.20 | 0.20 | 0.20 | 0.20 |
| Paraffin flooded out | 3' | 3' | 4' | 17' |
| Paraffin non-smudging | 5' | 4.5' | 7.5' | 28' |

In Table II, again, the short polymerization times of Examples 5 – 7 are conspicuous in comparison with Comparison Example 8a, in which the initiator component D is missing.

In the examples which follow, films with various α-hydroxyketones are manufactured from the polyester resin PE 2, and compared. The composition of the lacquer solutions, the dust-dry time, and the time in which degree of dryness 1 according to DIN 53,150 of April 1967 is reached at 22°C and 26% relative humidity, as well as the time in which the film surface becomes non-tacky, are summarised in Table III. The amounts of α-hydroxyketone are equimolar relative to dihydroxyacetone.

Abbreviations as in Table I.

Table III

The amounts listed here are specified in grams.

| Example No. | 9 | 10 | 11 | 12 | 12a |
|---|---|---|---|---|---|
| Component A |  |  |  |  |  |
| AP-Peroxide paste | 0.40 | 0.40 | 0.40 | 0.40 | 0.40 |
| Components B+C |  |  |  |  |  |
| Vanadium compound solution I | 0.10 | 0.10 | 0.10 | 0.10 | 0.10 |
| Component D |  |  |  |  |  |
| Dihydroxyacetone | 0.050 | — | — | — | — |
| Acetol | — | 0.041 | — | — | — |
| α-Hydroxycyclohexanone | — | — | 0.063 | — | — |
| α-Hydroxycyclopentanone | — | — | — | 0.056 | — |
| Dust-dry time (mins.) | 14 | 14 | 14 | 16 | 35 |
| Drying stage 1 (mins.) | 33 | 33 | 33 | 33 | 75 |
| Non-tacky stage (hours) | 3 | 3 | 3 | 3 | 7 |

Examples 9 – 12 clearly demonstrate, relative to Comparison Example 12 a in which the initiator component D is absent, the considerable shortening of the drying process of an air-drying polyester resin by means of the 4-component initiator system according to the invention.

EXAMPLES 13 AND 13A

Manufacture of a filling composition by mixing the following constituents:
36.00 g of polyester solution PE 1
28.70 g of talc
1.60 g of titanium dioxide RKB (Bayer)
28.70 g of asbestine
4.80 g of lithopone
0.18 g of α-hydroxycyclohexanone, fused (component D)
3.00 g of methyl ethyl ketone (hydro)peroxide 50 % strength (component A)

The same composition as above, but without α-hydroxycyclohexanone, serves as Comparison Example 13a.

For curing, 3 g of vanadium compound solution I (components B + C) (see Table I) are incorporated into each of the filling compositions and the compositions are spread approx. 1 mm thick on iron sheets.

| Property | non-tacky after | grindable after |
|---|---|---|
| Example 13 | 15 minutes | 30 minutes |
| Comparison Example 13a | 50 minutes | 120 minutes |

EXAMPLE 14 AND 14A

Manufacture of a molding by mixing the following constituents:
42.00 g of polyester resin PE 2
0.30 g of Aerosil
16.00 g of lithopone
21.40 g of micro-talc
5.30 g of titanium dioxide RFD-J (Bayer)
10.70 g of Omya chalk
0.27 g of α-hydroxycyclohexanone, fused (component D)
3.00 g of methyl ethyl ketone (hydro)peroxide, 50 % strength (component A).

The same composition as above, but without α-hydroxycyclohexanone, serves as Comparison Example 14a.

For curing, 3 g of vanadium compound solution I (components B + C) (See Table I) are stirred into each of the compositions, and the composition is cast at approx. 3 mm thickness onto a tin lid.

| Property | non-tacky after |
|---|---|
| Example 14 | 19 minutes |
| Comparison Example 14a | 4.5 hours |

EXAMPLES 15 AND 16

Commercially available polymethyl methacrylate of medium molecular weight is dissolved in the listed amounts, in grams, of methyl methacrylate and glycol bis-methacrylate. 10 g portions of this solution are mixed, in test tubes, with the tabulated amounts, in grams, of fused α-hydroxyketone, peroxide paste and vanadium compound solution I, and the gelling time is determined in a thermostat at 20°C (abbreviations as in Table I).

Table IV

| The amounts listed here are specified in grams. | | | | |
|---|---|---|---|---|
| Example No. | 15 | 15a | 16 | 16a |
| Polymethyl methacrylate | 3.0 | 3.0 | 3.0 | 3.0 |
| Methyl methacrylate | 7.0 | 7.0 | 3.6 | 3.6 |
| Glycol bis-methacrylate | — | — | 3.4 | 3.4 |
| Dihydroxyacetone (component D) | 0.05 | — | 0.008 | — |
| AP-Peroxide paste (component A) | 0.40 | 0.40 | 0.40 | 0.40 |
| Vanadium compound solution I (components B + C) | 0.15 | 0.15 | 0.15 | 0.15 |
| Gelling time at 20°C | 20 mins. | 5 hrs. | 16 mins. | 4 hrs. |

EXAMPLES 17 AND 18

10 g portions of vinyl acetate, on the one hand, and 10 g portions of methyl methacrylate, on the other, are mixed, in test tubes, with the tabulated amounts, in grams, of fused dihydroxyacetone, peroxide paste and vanadium compound solution I, and the time to reach a viscous syrupy state (polymerization time I) is determined in a thermostat at 20°C.

Table V*

| Example No. | 17 | 17a | 18 | 18a |
|---|---|---|---|---|
| Vinyl acetate | 10 | 10 | — | — |
| Methyl methacrylate | — | — | 10 | 10 |
| AP-Peroxide paste (component A) | 0.40 | 0.40 | 0.40 | 0.40 |
| Vanadium compound solution I (components B + C) | 0.10 | 0.10 | 0.10 | 0.10 |
| Dihydroxyacetone (component D) | 0.05 | — | 0.05 | — |
| Polymerization time I | 30 mins. | 30 hrs. | 60 mins. | 12 hrs. |

EXAMPLE 19

10 g of PE 1 solution are polymerized in test tubes, as described in Examples 1 – 4, with 50% strength benzoyl peroxide paste in dibutyl phthalate (BP-peroxide paste), and vanadium compound solution I with and without dihydroxyacetone, by way of comparison, in a thermostat at 20°C.

| Example No. | 19* | 19a* |
|---|---|---|
| PE 1 | 10 | 10 |
| BP-Peroxide paste (component A) | 0.40 | 0.40 |
| Vanadium compound solution I (components B + C) | 0.10 | 0.10 |
| Dihydroxyacetone (component D) | 0.05 | — |
| Gelling time | 5 mins. | 18 hrs. |

*The amounts listed here are specified in grams.

We claim:
1. A polymerizable composition comprising:
   A. an organic peroxide;
   B. a trivalent or pentavalent compound of vanadium which is soluble in styrene, ethyl acetate, isopropanol, dimethyl formamide and monobutylphosphate to a minimum degree of 0.1% by weight, based on vanadium;
   C. a compound having P—O—H acidity selected from the group consisting of an acid of phosphorus, a partial ester of such an acid or an acidic salt of such an acid or ester;
   D. an α-hydroxyketone; and
   E. an ethylenisally unsaturated compound or mixture of copolymerizable ethylenisally unsaturated compounds, the polymerization of which can be initiated by free radicals.

2. The composition of claim 1 which contains 0.1 to 5 wt.% A based on E.

3. The composition of claim 1 containing 0.1 to 100 ppm (by weight, calculated as vanadium) of B based on E.

4. The composition of claim 1 containing 0.001 to 5 wt.% of phosphorus as C, based on E.

5. The composition of claim 1 containing 0.001 to 10 wt.% of D based on E.

6. The composition of claim 1 containing 0.005 to 3.0 wt.% of D relative to E.

7. The composition of claim 1 in which D is an α-hydroxy-ketone substituted by aliphatic groups.

8. The composition of claim 1 in which D is dihydroxyacetone, α-hydroxycyclohexanone, α-hydroxycyclopentanone, or acetol.

9. The composition of claim 1 in which E is a mixture of a polyester of an α,β-unsaturated dicarboxylic acid and a copolymerizable vinyl monomer.

10. The composition of claim 9 in which the polyester also has allyl ether radicals.

11. The composition of claim 1 in which E is a mixture of monomeric methyl methacrylate and poly(methylmethacrylate).

12. The process of curing a composition the polymerization of which can be initiated by free radicals, comprising forming the polymerizable composition of claim 1 by dissolving D in E and admixing C, B and A, or by dissolving C, B and A in E and admixing D, and allowing polymerization to take place.

13. The process of curing a composition the polymerization of which can be initiated by free radicals, comprising forming the polymerizable composition of claim 1 by dissolving A in one portion of E, dissolving B, C and D in another portion of E, and mixing the two portions, and allowing polymerization to take place.

14. Shaped articles manufactured by curing in a mold by the process of claim 12.

* * * * *